United States Patent [19]

Kormos

[11] Patent Number: 4,706,972
[45] Date of Patent: Nov. 17, 1987

[54] EXPANDING ARBOR FOR LOCATING THE AXIS OF AN INTERNAL SURFACE

[75] Inventor: Joseph M. Kormos, Milan, Mich.

[73] Assignee: Precision Devices, Inc., Milan, Mich.

[21] Appl. No.: 6,076

[22] Filed: Jan. 23, 1987

[51] Int. Cl.⁴ .............................................. B23B 31/40
[52] U.S. Cl. ..................................... 279/2 R; 33/520; 269/48.1; 279/1 L
[58] Field of Search ...................... 279/1 R, 1 L, 2 R; 269/48.2; 33/178 R, 520, 533

[56] References Cited

U.S. PATENT DOCUMENTS

| | | | |
|---|---|---|---|
| 2,766,532 | 10/1956 | Eisele | 279/2 R X |
| 3,100,117 | 8/1963 | Schneider et al. | 279/2 R |
| 3,792,856 | 2/1974 | Hernandez | 279/2 R X |
| 3,862,783 | 1/1975 | Morris | 33/178 R X |
| 4,567,664 | 2/1986 | Kickhofel | 33/178 R X |

Primary Examiner—Gil Weidenfeld
Assistant Examiner—Steven C. Bishop
Attorney, Agent, or Firm—Harness, Dickey & Pierce

[57] ABSTRACT

An expanding arbor apparatus for establishing the radial positioning of a workpiece of the type having a profiled internal surface. The arbor has a plurality of probe members which expand or contract when the separation between a pair of conical surfaces acting on the probe change. The radially outer end of the probes can be provided with any desired contour or shape to engage the workpiece surface in any desired manner. The arbor may be used with numerous workpiece internal profiles such as internal gear teeth or splines.

12 Claims, 4 Drawing Figures the separated probes, thus providing radial positioning of the workpiece at separated positions.

Additional benefits and advantages of the present invention will become apparent to those skilled in the art to which this invention relates from the subsequent description of the preferred embodiments and the appended claims taken in conjunction with the accompanying drawings.

EXPANDING ARBOR FOR LOCATING THE AXIS OF AN INTERNAL SURFACE

BACKGROUND OF THE INVENTION

This invention relates to a workpiece locating fixture and particularly to one useful for locating the center of an internal profiled surface such as internal gear teeth or splines.

Expanding arbors are used for holding and rotating workpieces and have a plurality of expanding members which engage an inside surface such as a bore. These devices position the workpiece relative to the internal surface for measuring concentricity or other dimensional relationships and for positioning a workpiece during machining operations. Several examples of such a device are described in U.S. Pat. No. 3,100,117. These devices have a number of balls which are supported by confronting and movable tapered surfaces which enable the radial positioning of the balls to be varied by moving the tapered surfaces toward or away from each other. The devices according to that patent are useful for locating a workpiece having a smooth surfaced bore, but are unsuited for positioning workpieces having internally profiled surfaces such as internal gear teeth or splines since the expanding balls may not properly engage with the profile features due to their diameter and shape. Expanding arbors of the above type cannot be modified to accomodate certain profile shapes since the diameter of their expanding balls is dictated by the configuration of the tapered surfaces and the range of radial expansion desired.

In view of the foregoing, it is an object of this invention to provide an expanding arbor device capable of locating components having profiled internal surfaces which is not subject to the disadvantages of devices according to the prior art.

In addition to testing concentricity of workpieces, their axial dimensions are often of significance. The above-mentioned U.S. patent provides a means for establishing the concentricity of an internal surface, but does not have means for simultaneously axially locating the workpiece. For some applications, there is a need for such simultaneous location of a workpiece. Accordingly, it is a further object of this invention to provide an arbor for locating a workpiece with respect to its concentricity and axial dimensions.

SUMMARY OF THE INVENTION

In accordance with this invention, an apparatus is provided having a plurality of radially movable probes which are positioned to engage an internal profiled surface in a predetermined manner. These probes have specially shaped tips for a particular surface configuration, for example, the probes can be configured to engage internal gear teeth profiles at the gear pitch diameter, or to engage the radially outer surface of internal splines. The expandible probes have spherical inner ends which ride on a pair of tapered surfaces such that the probes move radially as the separation between the tapered surfaces changes. One embodiment of an expanding arbor according to this invention includes arms having spring loaded fingers which act on one end surface of the workpiece to urge the workpiece into contact with a gaging surface, thus axially positioning the workpiece. Another embodiment of an apparatus according to this invention features two sets of axially

DETAILED DESCRIPTION OF THE INVENTION

Figure 1:
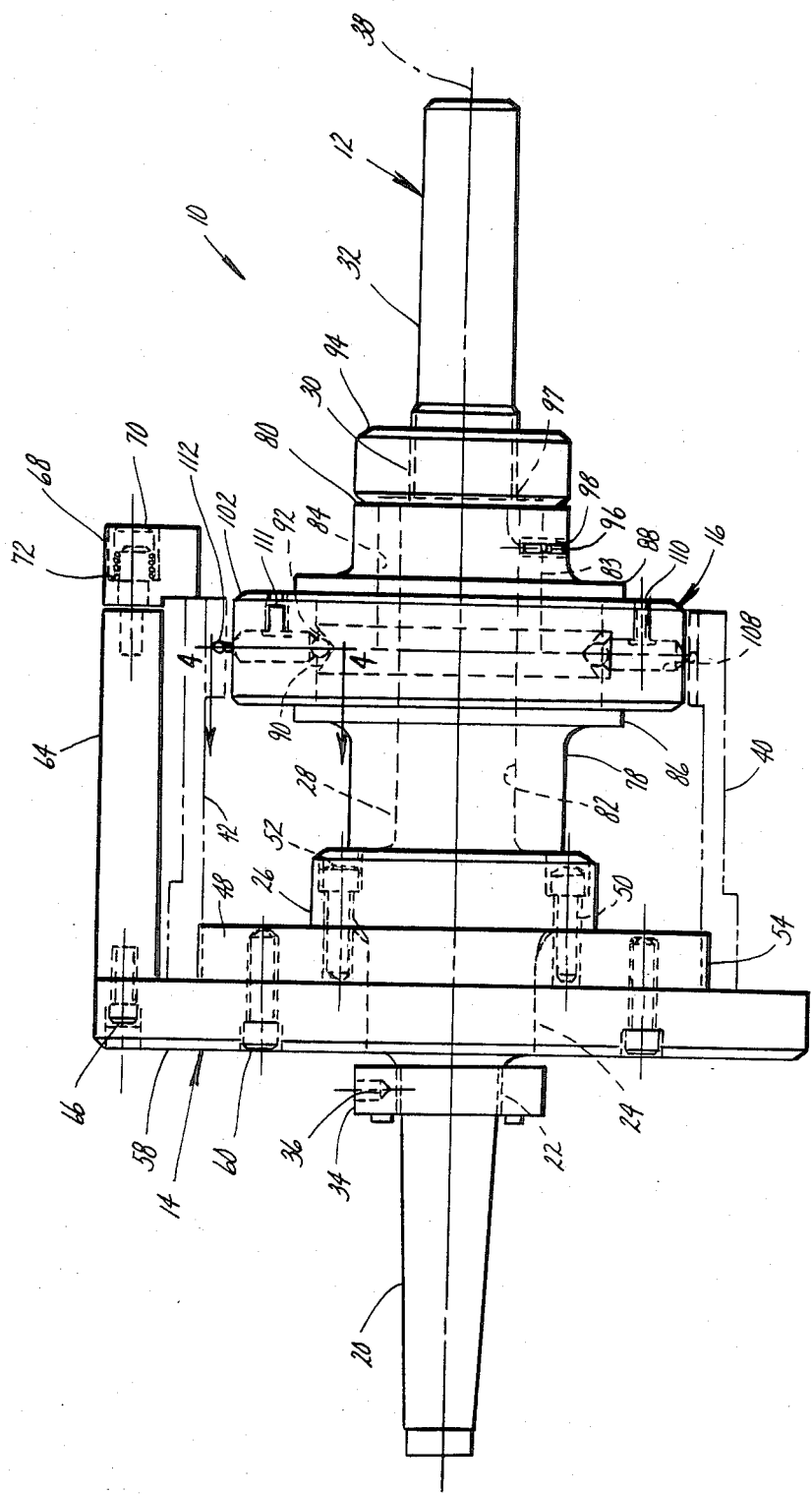
FIG. 1 is a side view of an expanding arbor apparatus for locating the axis of an internal surface according to a first embodiment of this invention shown positioning a workpiece.
Figure 2:
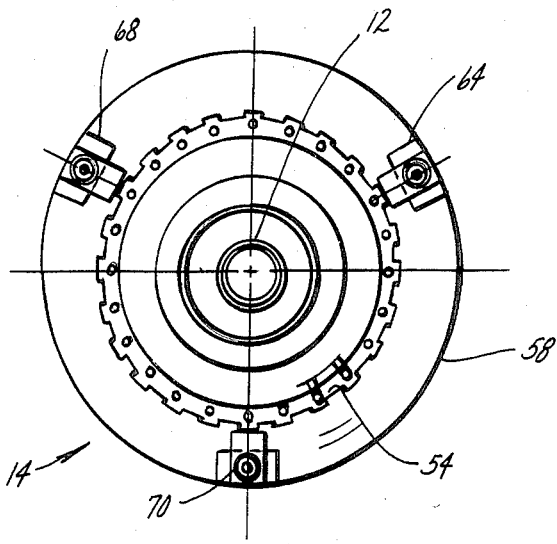
FIG. 2 is a front view of the apparatus in FIG. 1.
Figure 3:
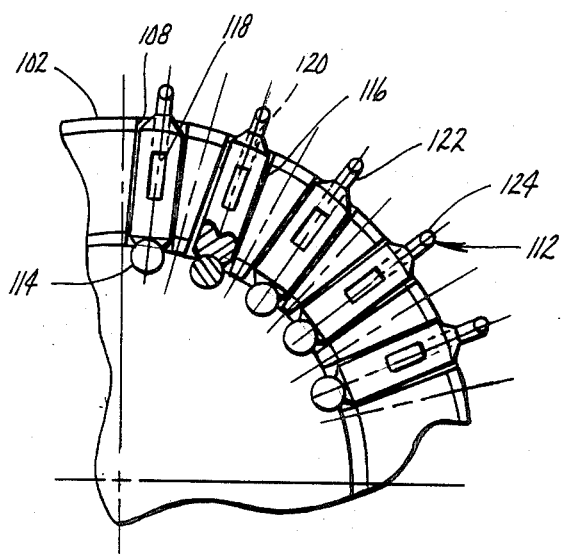
FIG. 3 is a partial cross-sectional view taken along lines 3—3 of FIG. 1, particularly showing a number of the radially extendible probe members.

An expanding arbor apparatus according to a first embodiment of this invention is shown in FIGS. 1, 2, and 3 and is generally designated by reference number 10. Expanding arbor apparatus 10 generally comprises spindle 12, base plate assembly 14, and radial positioning assembly 16.

The configuration of spindle 12 is best described with reference to FIG. 1. One end 20 of spindle 12, positioned at the left in FIG. 1, defines a Morse taper, enabling the spindle to be supported by standard turning and gaging equipment. Spindle 12 has a stepped configuration defining cylindrical surfaces 22, 24, 26, 28, 30 and 32, all centered about reference axis 38. Cylindrical surface 26 has the largest diameter of the spindle surfaces and has a plurality of axially oriented bores 52. Surfaces 22 and 30 define external screw threads and surface 32 is knurled. Ring 34 has internal screw threads and is threaded onto threaded surface 22. Blind bore 36 within ring 34 may be used as a gauging point to establish a rotational datum position of spindle 12.

An exemplary workpiece used with expanding arbor apparatus 10 is shown in phantom lines in FIGS. 1 and 2. Workpiece 40 has a generally cylindrical outer surface and defines an internally splined surface 42 having inwardly directed teeth.

Radial positioning plate 48 is loaded onto spindle 12 and is fastened thereto by fasteners 50 passing through bores 52 of spindle cylindrical section 26. The outer surface of plate 48 defines a splined profile 54 which meshes with the splined surface of workpiece 40. Base plate 58 is positioned on spindle 12 and is attached thereto by fasteners 60 passing through bores within the base plate and positioning plate 48.

The axial positioning of workpiece 40 is established through the use of three axially extending posts 64, which are fastened to base plate 58 by fasteners 66 passing through corresponding bores. Fasteners 70 attach locating pads 68 and springs 72 to posts 64, such that locating pads 68 are biased toward posts 64. Accordingly, springs 72 cause the workpiece to be firmly clamped against base plate 58.

Radial position assembly 16 includes a pair of mandrels 78 and 80. Mandrel 78 has an internal bore 82 which enables it to slide onto spindle surface 28, and further has a projecting tube portion 83. Mandrel 80 has an internal bore 84 enabling it to slide onto tube portion 83. Mandrels 78 and 80 include radially projecting flanges 86 and 88 which define conical surfaces 90 and 92, respectively. One axial end of mandrel 78 abuts the shoulder of spindle cylindrical surface 26, whereas an axial end of mandrel 80 contacts threaded ring 94, which threads onto spindle surface 30. Rotation of ring 94 enables the separation distance between conical surfaces 90 and 92 to be adjusted. Set screw 96 is threaded into bore 98 of mandrel 80 and fits within an elongated groove 97 within mandrel tube portion 83 such that the mandrels 78 and 80 are maintained in an assembled condition.

Figure 4:
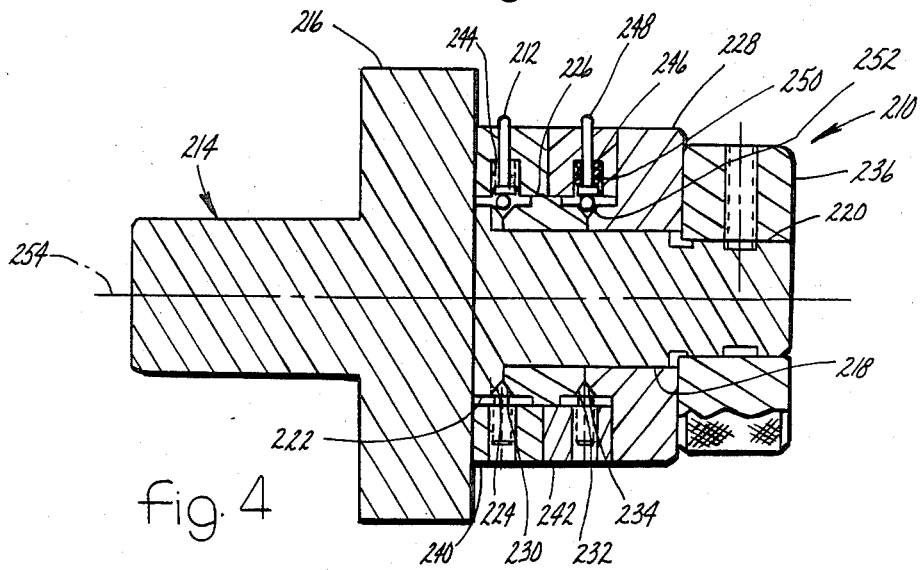
FIG. 4 is a side view of an expanding arbor apparatus for locating the axis of an internal surface according to a second embodiment of this invention having two sets of axially separated, radially extending probes.

Collar 102 has a plurality of radially directed bores 108. Set screw bores 110 are provided for set screws 111 which extend in the axial direction and intersect bores 108. Probe members 112 are disposed within bores 108, as best shown in FIG. 4. Probe members 112 have a spherically shaped inner end 114 which may, for example, be formed by a hardened metal ball. The probe body 116 extends radially from spherical end 114 and includes an axially elongated groove 118 which is provided to engage with set screw 111 which permits the probe member 112 to move axially through a desired range but prevent them from being removed from bores 108. Probe member body 116 further has an axial bore 120 which receives probe tip 122. Probe tip 122 is rigidly affixed within bore 120, for example, by silver soldering, adhesives, interference fit, etc. The configuration of probe tip 122 is designed to engage the irregular inside surface of the associated workpiece in a predetermined manner. In the embodiment shown herein, probe tip 122 has a spherical end surface 124 which engages the splined surfaces of workpiece 40 at the pitch diameter of the gear teeth. Other examples of potential workpieces which could be employed in connection with this embodiment are gears having internal teeth. For such a workpiece, a spherical tip could be employed having a specified radius to engage the teeth profile in a predetermined manner, for example, at the pitch radius of the gear.

In operation, workpiece 40 is positioned so that it engages radial positioning plate 48. Next, ring 94 is rotated to force mandrel conical surfaces 90 and 92 together which move probe members 112 in a radially outward direction due to the interaction between the conical surfaces and probe spherical ends 114. Radial expansion of probe members 112 causes spherical end surfaces 124 to engage portions of the inside surface of the workpiece. Since the probe members expand radially in a uniform manner, expansion to the point of full engagement with the workpiece causes the workpiece to be precisely radially positioned with respect to reference axis 38 passing through spindle 12. Axial positioning of the workpiece is achieved by mounting locating pads 68 onto posts 64 and tightening fastener 70, causing compression of spring 72 which resiliently bias the workpiece against base plate 58.

A second embodiment of an expanding arbor apparatus 210 according to this invention is shown in FIG. 4. Arbor 210 differs principally from arbor 10 in that the two sets of axially separated probe members 212 are provided. Spindle 214 includes a radial flange 216, a smooth cylindrical surface 218, and a threaded end cylindrical surface 220. Spindle 212 further has a shoulder 222 defining conical surface 224. A pair of mandrels 226 and 228 are provided. Mandrel 226 defines pairs of conical surfaces 230 and 232 on opposite ends, whereas mandrel 228 defines a single conical surface 234. Ring 236, when threaded onto threaded end 220, causes mandrels 226 and 228, and conical surfaces 224 and 230, and 232 and 234 to approach each other. Collars 240 and 242 have radial bores 244 and 246, respectively. Probe members 212 are disposed in bores 244 and 246, and have spherical end surfaces 248. Probe members 212 are biased in a radially inward direction by coil springs 250. Balls 252 are positioned between the confronting sets of conical surfaces and act on probe members 212. When ring 236 is tightened onto spindle 214, the conical surfaces interact with balls 252 to cause probes 212 to expand radially.

The second embodiment is particularly advantageous where it is desired not only to radially position the workpiece, but further to position the longitudinal axis of the workpiece with respect to the reference axis 254 of arbor 210.

While the above description constitutes the preferred embodiments of the present invention, it will be appreciated that the invention is susceptible to modification, variation and change without departing from the proper scope and fair meaning of the accompanying claims.

What is claimed is:

1. An expanding arbor apparatus for radially positioning a workpiece with respect to a reference axis, said workpiece of the type having a profiled internal surface, said expanding arbor apparatus comprising:
   a spindle defining said reference axis,
   a mandrel disposed on said spindle defining a first conical surface, said mandrel axially movable along said spindle,
   means for defining a second conical surface,
   means for axially positioning said first and second conical surfaces such that the separation therebetween may be adjusted,
   a collar encircling said spindle and said conical surfaces, said collar having a plurality of radially extending bores,
   a plurality of probe members installed within said collar bores, said probes movable axially within said bores and having an inner end engageable with said conical surfaces, and an outer end configured to engage said workpiece inside surface, whereby when said workpiece is loaded onto said arbor and said conical surfaces are moved toward each other, said probes expand radially outwardly, thereby engaging said workpiece inside surface and establishing the radial positioning of said workpiece.

2. An expanding arbor apparatus according to claim 1 wherein said probes inner and outer end surfaces are partially spherical.

3. An expanding arbor apparatus according to claim 1 wherein said probes are resiliently biased into contact with said conical surfaces.

4. An expanding arbor apparatus according to claim 1 wherein said probes having a body portion with a longitudinal bore, and a tip disposed in said bore and affixed to said probe body, said tip defining said outer end surface.

5. An expanding arbor apparatus according to claim 1 wherein said collar defines second bores intersecting with said radial bores and further comprises set screws disposed in said second bores and interacting with grooves on said probes to prevent said probes from being removed from said radial bores.

6. An expanding arbor apparatus according to claim 1 further comprising a radial positioning plate rotatable with said spindle and engaging said inside surface of said workpiece.

7. An expanding arbor apparatus according to claim 1 further comprising: a base plate rotatable with said spindle, a plurality of arms extending longitudinally with respect to said spindle, locating pads engageable with said arms and said workpiece to axially position said workpiece.

8. An expanding arbor apparatus according to claim 7 wherein said locating pads are resiliently biased toward said workpiece.

9. An expanding arbor apparatus according to claim 1 wherein said means defining said second conical surface is a second mandrel disposed on said spindle.

10. An expanding arbor apparatus for radially positioning a workpiece with respect to a reference axis, said workpiece being of the type having a profiled internal surface, said expanding arbor apparatus comprising:
   a spindle defining said reference axis,
   a first mandrel disposed on said spindle defining a first conical surface,
   a second mandrel disposed on said spindle defining a second conical surface,
   means for axially positioning said first and second conical surfaces such that the separation therebetween may be adjusted,
   a collar encircling said spindle and said conical surfaces, said collar having a plurality of radially extending bores,
   a plurality of probe members installed within said collar bores, said probes movable axially within said bores and having a spherically shaped inner end engageable with said conical surfaces, and an outer end configured to engage said workpiece inside surface, whereby when said workpiece is loaded onto said arbor and said conical surfaces are moved toward each other, said probes expand radially outwardly, thereby engaging said workpiece inside surfaces and establishing the radial positioning of said workpiece, said probe members defining a groove in registering with said second bores,
   means for retaining said probe members within said collar bores,
   a radial positioning plate rotatable with said spindle and engaging said internal surface of said workpiece,
   a base plate rotatable with said spindle,
   a plurality of arms extending longitudinally with respect to said spindle, and
   locating pads engageable with said arms and said workpiece to axially position said workpiece.

11. An expanding arbor apparatus for fixing the radial positioning of a workpiece with respect to a reference axis, said workpiece of the type having a profiled internal surface, said expanding arbor apparatus comprising:
   a spindle,
   means defining a first conical surface,
   a first mandrel defining second and third conical surfaces at its opposing axial ends,
   a second mandrel defining a fourth conical surface,
   means for adjusting the separation distance between said first and second conical surfaces, and for adjusting the separation distance between said third and fourth conical surfaces,
   a first collar encircling said spindle and said first and second conical surfaces, said first collar having a plurality of radially extending bores,
   a second collar encircling said spindle and said third and fourth conical surfaces, said second collar having a plurality of radially exptending bores, and
   a plurality of probe members installed within said first and second collar bores, said probes movable axially within said bores and having an inner end engageable with said conical surfaces, and an outer end configured to engage said workpiece internal surface, whereby when said workpiece is loaded onto said arbor and said conical surfaces are moved toward each other, said probes expand radially outwardly, thereby engaging said workpiece and establishing the radial positioning of said workpiece.

12. An expanding arbor apparatus according to claim 11 wherein said probes inner and outer end surfaces are partially spherical.

* * * * *